United States Patent [19]
Petrovich et al.

[11] Patent Number: 5,632,500
[45] Date of Patent: May 27, 1997

[54] MODIFIED VEHICLE THROTTLE CONTROL

[75] Inventors: Paul A. Petrovich, Fowlerville; Jack G. Rodgers, Roseville; John J. Schmitz, St. Clair Shores, all of Mich.

[73] Assignee: The United States of America as represented by the Secretary of the Army, Washington, D.C.

[21] Appl. No.: 605,303

[22] Filed: Jan. 29, 1996

[51] Int. Cl.⁶ .................................................. B62D 1/14
[52] U.S. Cl. ........................................ 180/332; 180/336
[58] Field of Search ................................ 180/315, 320, 180/332, 334, 335, 336

[56] References Cited

U.S. PATENT DOCUMENTS

| | | | |
|---|---|---|---|
| 4,034,823 | 7/1977 | Houskamp et al. | 180/332 |
| 4,415,056 | 11/1983 | Smith | 180/332 |
| 4,646,870 | 3/1987 | Koch et al. | 180/336 |
| 4,727,710 | 3/1988 | Kuhn | 180/336 |

*Primary Examiner*—Kenneth R. Rice
*Attorney, Agent, or Firm*—Peter A. Taucher; David L. Kuhn

[57] ABSTRACT

An adapter mechanism converts a manual throttle control to a powered manually overidable throttle control. The manual control has a housing element, a post rotatable in the housing element and a control lever connected to the post. A first rotor plate engaged by the lever swings on the post to rotate a second rotor plate in one direction so as to translate a cable. The manual control has a return spring biassing the second plate in another direction toward a position where the cable closes the throttle. The adapter mechanism has a block-like cap on the housing element and the cap has a cavity open to the housing element. An actuator motor on the cap rotates a paddle in the first and second directions. A flange of the paddle engages a tab of the first rotor plate such that the paddle's rotation in the first direction moves the rotor elements but the paddle's rotation in the second direction exerts no force on the rotor elements.

10 Claims, 2 Drawing Sheets

5,632,500

MODIFIED VEHICLE THROTTLE CONTROL

GOVERNMENT USE

The invention described here may be made, used and licensed by or for the U.S. Government for governmental purposes without paying us royalty.

BACKGROUND AND SUMMARY

Currently the U.S. Army is investigating methods to remove unexploded shells from artillery ranges and secured battle zones. One promising method uses remotely controlled vehicles having robotic accessories for shell removal. Since the vehicles will perform highly risky operations, it is likely that they will be damaged or destroyed with some regularity. It is therefore preferred that such vehicles be as cheap and expendable as possible. One practical and relatively inexpensive way to obtain such vehicles is to modify small commercially available off-road vehicles. It is preferred that these modified vehicles be capable of both manual and robotic operation. To meet part of the requirements Just related, we have invented an adapter subassembly that modifies adapts an existing manual throttle control device for manually overridable, powered, remotely controlled operation. Our subassembly is built of common, commercially available items and materials, so that the subassembly can be made inexpensively and without sophisticated manufacturing methods.

The modified throttle control device has a housing element, a post rotating in the housing element, and a manual control lever connected to the post. The lever rotates first and second rotor plates in a first direction about the post, thereby moving a cable engaging the second plate to a throttle-open position. A return spring biases the second plate in a second, opposite direction so as to bias the cable toward a throttle-closed position. Terminal elements of a throttle shut off switch are on the plates. The plates are biassed apart so that the switch is biased to an open, shut-off condition. Consequently, the switch will always shut off fuel flow to the engine unless force is positively applied to the control lever.

The adapter subassembly has a clear flat block-like cap removably affixed to the housing element, the cap having a cavity open toward the housing element. An actuator motor demountably secured to the cap rotates a paddle in the first and second directions, the actuator motor having a backdrive force less than the bias of the return spring. A flange of the paddle engages the tip of a tab, which is the terminal element on the first rotor plate. The flange is oblique to the tab and juxtaposed therewith such that the paddle's rotation in the first direction moves the rotor elements but the paddle's rotation in the second direction exerts no force on the rotor elements.

DETAILED DESCRIPTION

Figure 1:
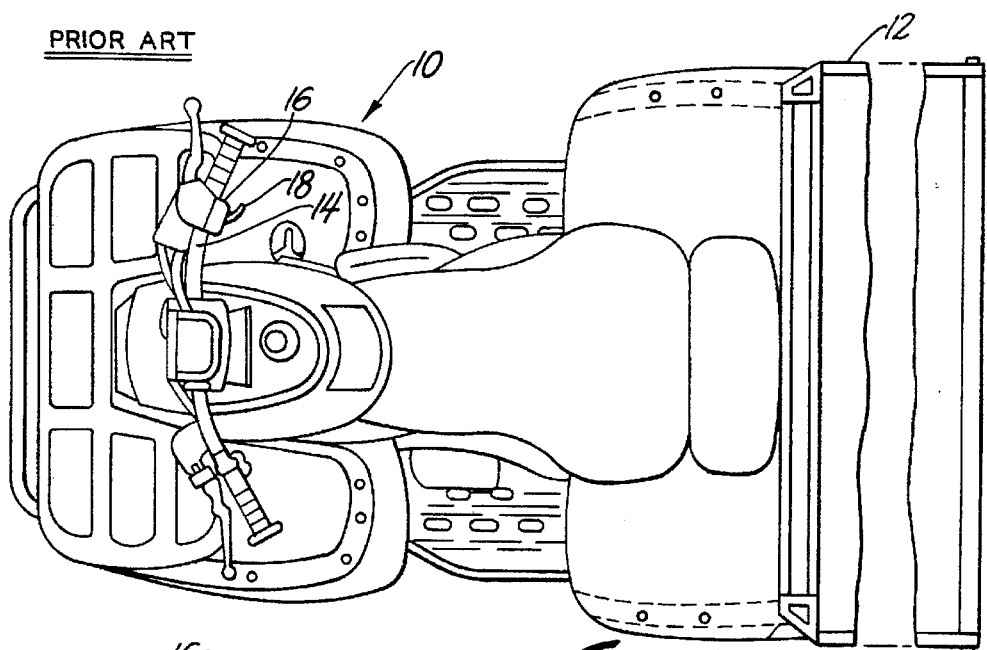
FIG. 1 is a partial plan elevational view of typical commercially available utility vehicle.

In FIG. 1 is a common utility vehicle 10 having load bed 12 that is for convenience only partly shown. On the right side of the vehicle's handle bar subassembly 14 is a throttle control housing 16 and a throttle control lever 18 extending from housing 16.

Figure 2:
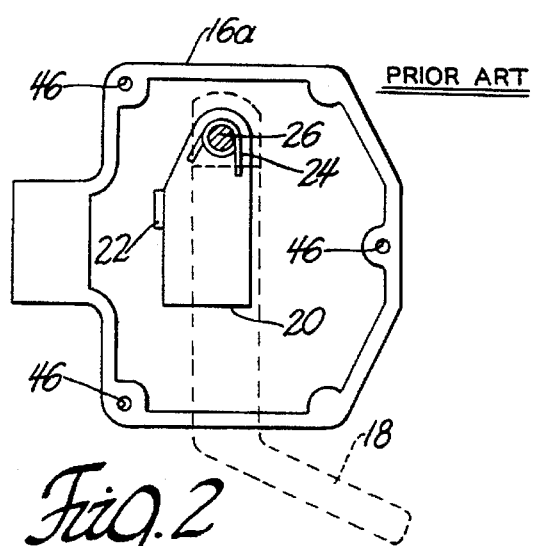
FIGS. 2 and 3 are plan elevational views of a portion of a conventional throttle control housing and conventional throttle control components therein.
Figure 3:
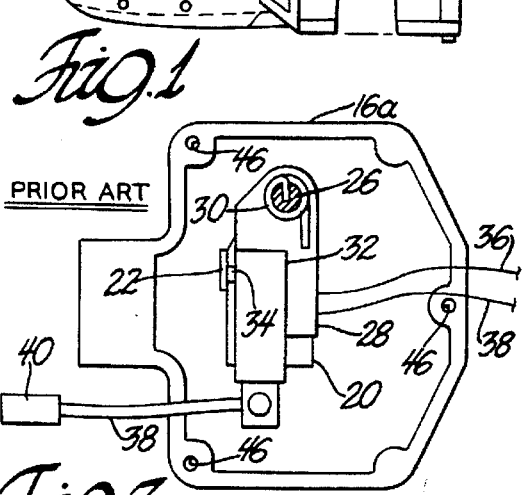

FIGS. 2 and 3 are plan views of the known lower portion 16a of the throttle housing 16 (FIG. 1) and typical conventional elements associated therewith. In FIG. 2, pivot post 26 is journalled to housing portion 16, post 26 being turned by manual operation of throttle control lever 18. Swung by post 26 is a first rotor plate 20, which has a carrier tab 22 at one edge and a coil spring 24 thereon. Journalled on post 26 and disposed atop first rotor plate 20 is a second rotor plate 28 (FIG. 3) biased by a coiled return spring 30. One leg of spring 30 is typically fixed to post 26 and the return spring's other leg is fixed to plate 28. When lever 18 pivots counterclockwise from the FIG. 2 position, it carries plates 20 and 28 with it. Spring 30 will then bias plate 28, plate 20 and lever 18 clockwise back toward their respective FIG. 2 and FIG. 3 positions. At the FIG. 2 and 3 positions of plate 28, plate 20, and lever 18, fuel is shut of from the engine of vehicle 10.

Fixed upon plate 28 is an electronic element 32 whose electrical contact 34 normally bears against carrier tab 22, element 32 having signal lines 36 and 38 leading therefrom. Coil spring 24 biases rotor plate 20 and rotor plate 28 in opposite angular directions about post 26, whereby contact 34 is biassed away from carrier tab 22. Attached to one end of element 32 is a standard throttle control cable 38 extending from sheath 40, the cable's translation in sheath 40 governing fuel flow to the engine of vehicle 10. Cable 38 is biased toward its fuel shut off position (FIG. 3) by the bias of spring 30 on plate 28. If lever 18 is manually released but the bias of spring 30 fails to return cable 38, plate 28 and plate 20 to their FIG. 3 shut off positions, then plate 20 will nevertheless rotate away from plate 28 by action of spring 24, whereby contact 34 is removed from carrier tab 22. Vehicle 10 has circuitry connected to lines 36 and 38 which causes interruption of fuel flow to the vehicle engine in response to separation of contact 34 from carrier tab 22. Spring 24 thus has an automatic fuel shut-off function. Because of springs 24 and 30, lever 18 must maintain a rotational force on plates 20 and 28 to keep fuel flowing to the engine.

Figure 5:
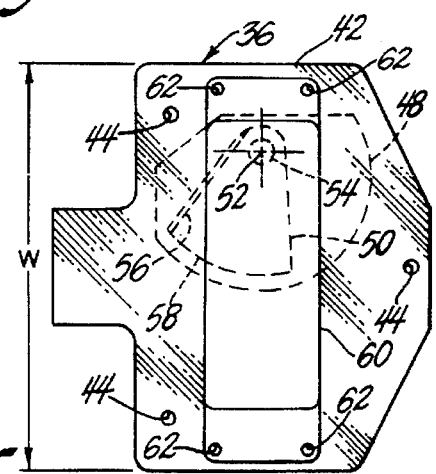
Figure 6:
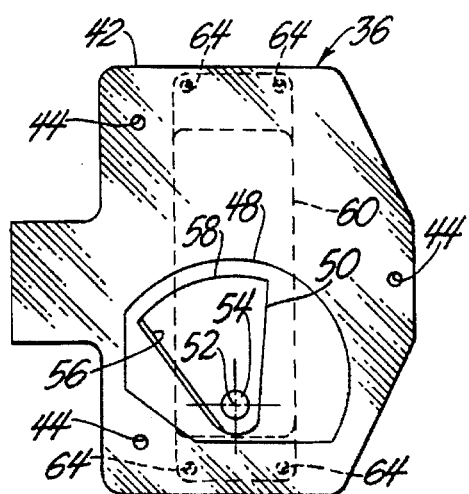
FIG. 6 is a plan view of a sweeper paddle of our actuator subassembly Juxtaposed with conventional throttle control elements.

FIGS. 5 and 6 are top and bottom views of our throttle actuator subassembly 36 which replaces the existing cover of throttle control housing 16. Subassembly 36 has a thick, relatively flat cap 42 which is made of a transparent machinable material. This material can be a polycarbonate resin material such as plexiglass. The cap's thickness is typically between one-forth and three-fourths of an inch. Cap 42 has a pattern of bolt holes 44 matching a complimentary pattern of bolt holes 46 in housing portion 16a. Cap 42 is preferably made from common wide flat bar stock having width W (FIG. 5) and a thickness between ½" and ¾", the cap preferably having the same width and thickness as the bar stock from which it was made. Cap 42 has a shallow flat cavity 48 open at the inner or bottom surface of the cap, the cavity accommodating a limited angular travel of sweeper paddle 50 about axis 52.

Figure 4:
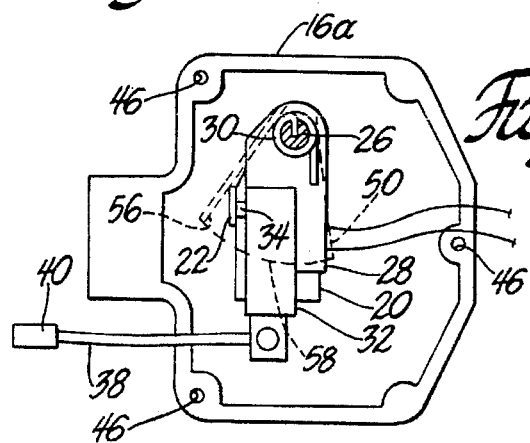
FIGS. 4 and 5 are respective top and bottom elevational views of our remotely controllable actuator subassembly.

Paddle 50 is releasably affixed to shaft 54 by any suitable means, such as set screws, and shaft 54 axially aligns with post 26 when subassembly 36 is bolted to housing portion 16a. Paddle 50 has a flat sector-shaped portion 58 having along one edge thereof a straight flange 56 that serves to reinforce sector-shaped portion 58. Flange 56 protrudes outward from cavity 48 into housing portion 16a and serves as a means to engage carrier tab 22. It is desired for two reasons that flange 56 be oblique to tab 22 so as contact an edge of the tab 22 (FIG. 4). First, we find that facial contact between tab 22 and flange 56 causes interfacial friction between them, making it more difficult for paddle 50 to rotate rotor plate 28. The interfacial friction is due to slight axial misalignment between post 26 and shaft 54, which in turn is due to fabrication tolerances. Second, placing flange 56 oblique to tab 22 allows flange 56 to be straight, so that paddle 50 is easier to form and can be made from common angle steel stock. This latter advantage is important since subassemblies 36 will possibly be made at U.S. Army depots or small job shops, which generally have little sophisticated manufacturing equipment.

Shaft 54 is driven by a standard electric actuator motor 60 mounted on cap 42. Motor 60 is preferably mounted by screws (not shown) passing through the motor's mount holes 62 (FIG. 5) and threadingly engaging tapped holes 64 (FIG. 6) of cap 42, whereby motor 60 is removably fastened to cap 42. The aforementioned mounting with screws allows either the cap or motor to be replaced without replacing both. It is also preferred that tapped holes do not extend all the way through cap 42 so that no sealing for housing 20 is needed at these holes The thickness of cap 42 allows holes 64 to be tapped sufficiently deep to solidly anchor the screws as they hold motor 60 to cap 42.

It has been found that even the machined surfaces of cavity 48 are sufficiently transparent to allow one to view the interior of housing portion 16a, both during and after the cap's placement thereon. Consequently, the portion of cap 42 not covered by motor 60 acts as an observation window to detect, for example, whether cable 38 has stuck in a throttle-open position. Also, this window allows one to see the juxtaposition of paddle flange 56 and carrier tab 22 as one places actuator subassembly 36 onto housing portion 16a, whereby one more easily locates flange 56 in its proper place (see FIG. 4) against tab 22.

During operation of throttle actuator subassembly 36, actuator motor 60 rotates paddle 50 counterclockwise from its FIG. 4 position and thereby rotates pivot plates 20 and 28 in the same direction. As a result, cable 38 is pulled from its FIG. 4 position and fuel flows to the vehicle engine, the rate of fuel flow being a function of the degree of turn of paddle 50. To stop fuel flow, motor 60 turns paddle 50 clockwise to the FIG. 4 position, whereupon return spring 30 rotates pivot plate 30 clockwise to push cable 38 to its FIG. 4, shut off position.

Should cable 38 stick in its cable sleeve 40 and not return to its shut off position, spring 24 will rotate plate 20 clockwise to separate carrier tab 22 from contact 34 and thereby interrupt fuel flow as discussed previously. It can be seen that subassembly 36 does not interfere with the secondary fuel shut off feature provided by spring 24. Also the internal friction, or back drive force, of actuator motor 60 is less than the biassing force of return spring 30. Hence, spring 30 returns paddle 50 to the FIG. 4 shut off position if no power is provided to actuator motor 66, so that loss of motor power does not prevent fuel shut off.

Figure 7:
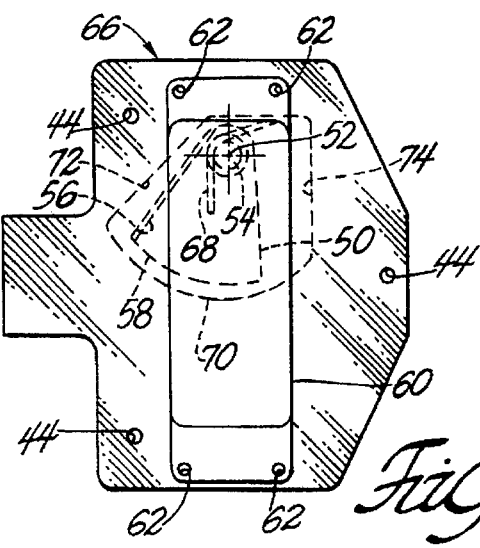
FIG. 7 is a plan view of an alternate embodiment of the actuator subassembly shown in FIGS. 4 and 5.
Figure 8:
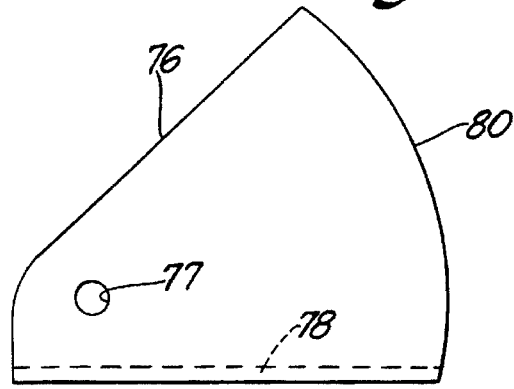
FIGS. 8 and 9 are respectively plan and side elevational views of a sweeper paddle used in the actuator subassembly.
Figure 9:
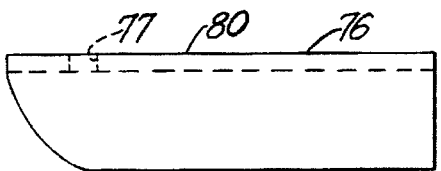

FIG. 7 shows throttle actuation subassembly 66 which is similar to subassembly 36 except for the addition of back drive compensator spring 68 and a cavity 70 which differs from cavity 48. Cavity 70 has a flat datum surface 72 against which bears paddle flange 56 when actuator shaft 54 is at a first known rotational position. When actuator motor 60 turns paddle 50 until flange 56 meets surface 72, the circuits or logic governing motor 60 can be reset or calibrated. Calibrating is done by using the first known rotational position of shaft 54 as a reference. A second flat datum surface can be provided at 74. When motor 60 rotates paddle 50 into contact with surface 74, shaft 54 is at a second known rotational position which can be used to reset or calibrate the aforementioned logic or circuitry. Additionally, surface 74 is a governor surface limiting the counterclockwise motion of paddle 50 and thereby limiting fuel flow to the engine of vehicle 10. The governing function of surface 74 may be desired in some cases where vehicle 10 is in remote robotic operation.

Still referring to FIG. 7, compensator spring 68 is a coil spring whose shorter leg connects to paddle 50, whose coil girds shaft 54 and whose longer leg lies against an internal peripheral surface of cavity 70. Spring 68 biases paddle 50 clockwise with a force slightly greater than the internal friction, or backdrive force, of motor 60. Thus, if motor 60 loses power, spring 68 returns paddle 50 to the shut off position. If cable 38 has then stuck in a throttle-open position, paddle 50 will not prevent spring 24 from rotating plate 20 to shut off fuel flow.

As an alternative to the use of spring 68, motor 60 may be provided with a conventional clutch (not shown) that keeps shaft 54 decoupled from motor 60 in the absence of electrical power thereto, whereby spring 24 can rotate plate 20 to shut off fuel flow if cable 36 sticks. Both the clutch and spring 68 may be regarded as means to keep throttle actuator subassembly 66 from defeating the automatic shut-off function of spring 24. As still another alternative, motor 60 may be selected so that its back drive force is less than the bias of spring 24 so that, again, subassembly 66 does not defeat the shut off function of spring 24.

Details of a preferred structure for attaching a paddle to a motor shaft 54 are shown by FIGS. 8 through 11 wherein sweeper paddle 76 is in all essential respects the same as paddle 50, except that aperture 77 in paddle 76 is smaller than its counterpart in paddle 50. Paddle 76 has a paddle flange 78 analogous to paddle flange 56. Paddle 76 also has a flat sector-shaped portion 80 analogous to portion 58 of paddle 50.

Figure 10:
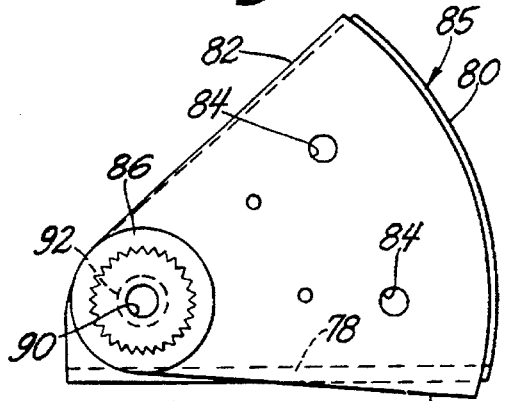
FIG. 10 is a plan elevational view of a shaft connector assembled to the paddle.
Figure 11:
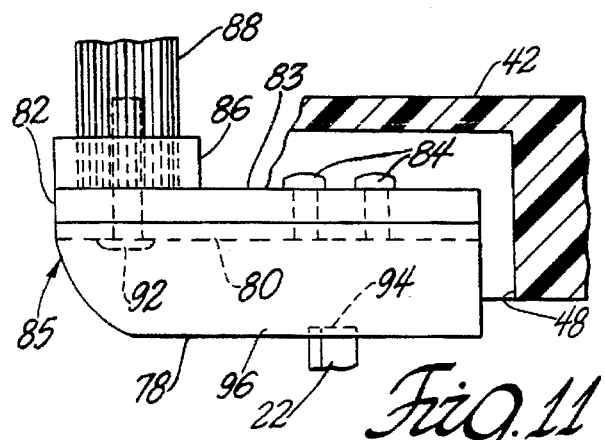
FIG. 11 is a side elevational view of the shaft connector, the paddle together with neighboring structure.
Figure 12:
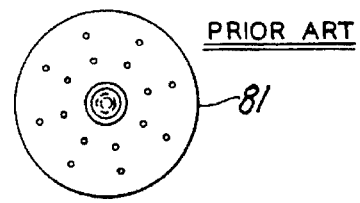
FIG. 12 is a conventional adapter for attaching components to a rotatable shaft.

FIG. 10 shows a sectored piece 82 removably fastened in facial relation upon sweeper paddle 76 by screws 84, thereby forming paddle unit 85. The sectored piece 82 is so called because it is a generally sector shaped part of a conventional nylon adaptor wheel 81 (FIG. 12) used to attach elements to a rotatable shaft. Sectored piece 82 has a flat arcuate web 83 and an internally splined collar 86 that receives a complimentarily splined shaft portion 88 as seen in FIG. 11. Concentric with collar 86 is aperture 90, which registers with aperture 77 of paddle 76, and a threaded fastener 92 passes through apertures 77 and 90 and thence into threaded engagement with shaft portion 88. Fastener 92 and screws 84 form a triangular pattern of fasteners which securely holds together web 83 and sectored piece 80, whereby paddle 76 and piece 82 act as reinforcement for one another. Due to this reinforcement, when the paddle flange engages tab 22 as discussed previously, neither paddle 78 nor sectored part 82 will buckle.

The above described structure of paddle unit 85 is highly preferred since it can be fabricated relatively easily from standard, commercially available items. Such items would include adapter 81 from which sectored piece 82 is made and common angle steel stock from which paddle 76 is made. The above described structure is thus more feasibly and economically fabricated in small quantities, say 50 units, at US Army depots or small job shops.

From FIG. 11 it can be seen that sectored piece 82 and the paddle's sector shaped portion 80 lie within cavity 48 of cap 42. Most, typically about two-thirds, of flange 78 also is within cavity 42. Preferably, flange 78 protrudes from cavity 48 only so much as is necessary to engage tip 94 of carrier tab 22, whereby only edge zone 96 of flange 78 contacts tip 94. By this preferred construction, flange 78 easily clears components other than tip 94 in housing portion 16a as it swings with paddle 76. Because of the mutual stiffening of web 83 and sector shaped portion 80, paddle unit 85 does not buckle and therefore flange edge zone 96 does not rise and slip over tip 94 of tab 22. The mutual stiffening of web 80 and portion 80 thus minimizes the amount of contact necessary between edge zone 96 and tip 94, and thereby minimizes the needed intrusion by flange 78 into housing portion 16a.

We do not desire to be limited to the exact details of construction or method shown herein since obvious modifications will occur to those skilled in the relevant arts without departing from the spirit and scope of the following claims.

What is claimed is:

1. A throttle control mechanism converted from manual operation to manually overidable powered operation, the throttle control mechanism comprising:

a throttle control housing element;

a throttle post rotatably mounted to the housing element;

a throttle control lever connected to the post and movableby a manual force;

a first rotor element connected to the lever swingable about an axis of the throttle post;

a second rotor element rotatable by the first rotor element in a first direction about the axis;

a throttle control cable;

means for connecting the cable to the second rotor element;

a return spring biassing the second rotor element in a second direction about the axis toward a closure position where the cable is in a throttle-closed position;

an electrical contact on the second rotor element;

a line electrically communicated to the contact;

means communicated with the contact for stopping fuel flow when the cable defeats bias of the return spring and sticks in a throttle-open position;

a cap removably affixed to the housing element;

the cap defining a cavity open toward the housing element;

an actuator motor demountably secured to the cap, the actuator motor having a backdrive force less than the bias of the return spring;

a shaft of the actuator motor;

a paddle releasably attached to the shaft and rotatable in the first direction and in a second direction with the shaft;

peripheral wall portions of the cavity limiting the rotation of the paddle;

a flange of the paddle engaging a tab of the first rotor element faced away from the second rotor element such that the paddle's rotation in the first direction moves the rotor elements but the paddle's rotation in the second direction exerts no force on the rotor elements.

2. The mechanism of claim 1 further comprising means to prevent the motor's backdrive force from defeating the stopping means.

3. The mechanism of claim 1 further comprising:

logic circuitry communicated to the motor for controlling rotational positioning of the paddle;

means for resetting the logic circuitry, the resetting means including a reference surface formed by one of the peripheral portions.

4. The mechanism of claim 1 further comprising means for limiting throttle opening caused by rotation of the paddle, the limiting means including a governor surface formed on one of the peripheral portions.

5. A throttle control mechanism converted from solely manual operation to manually overidable powered operation, the mechanism comprising:

a throttle control housing element;

a throttle post rotatably mounted to the housing element;

a throttle control lever connected to the post and movable by a manual force;

a first rotor element connected to the lever swingable about an axis of the throttle post;

a tab on the first rotor element;

a second rotor element rotatable by the first rotor element in a first direction about the axis;

a throttle control cable;

means for connecting the cable to the second rotor element;

a return spring biassing the second rotor element in a second direction about the axis toward a closure position where the cable is in a throttle-closed position;

an electrical contact on the second rotor element;

a line electrically communicated to the contact;

means communicated with the contact for stopping fuel flow when the cable defeats bias of the return spring and sticks in a throttle-open position;

a thick, generally planar transparent cap removably affixed to the housing element;

the cap defining a cavity inset with respect to the cap and open toward the housing element;

blind holes defined by the cap;

an actuator motor demountably secured to the cap by fasteners engaging the blind holes, the actuator motor having a backdrive force less than the bias of the return spring;

a shaft of the actuator motor essentially axially aligned with the post extending into the housing element;

a paddle releasably attached to the shaft and rotatable in the first direction and in a second direction with the shaft in the cavity;

wherein the motor is positioned on the cap so as to define an observation window visually exposing the rotor elements, the paddle and the cable;

a flange of the paddle oblique to the tab on the first rotor element, the flange engaging an edge of the tab such that the paddle's rotation in the first direction moves the rotor elements but the paddle's rotation in the second direction exerts no force on the rotor elements.

6. The mechanism of claim 5 further comprising:

logic circuitry communicated to the motor for controlling rotational positioning of the paddle;

inner peripheral wall portions of the cavity;

means for resetting the logic circuitry, the resetting means including a reference surface formed by one of the peripheral portions;

means for limiting throttle opening caused by rotation of the paddle, the limiting means including a governor surface formed on another of the peripheral portions.

7. The mechanism of claim 5 wherein:

the stopping means is a shut off spring biassing the first rotor element away from the second rotor element;

the back drive force is less than the biassing force of the shut off spring.

8. A throttle control mechanism converted from manual operation to manually overidable powered operation, the mechanism comprising:

a throttle control housing element;

a throttle post rotatably mounted to the housing element;

a throttle control lever connected to the post;

a first rotor element connected to the lever swingable about an axis of the throttle post;

a second rotor element rotatable by the first rotor element in a first direction about the axis;

a throttle control cable;

means for connecting the cable to the second rotor element;

a return spring biassing the second rotor element in a second direction about the axis toward a closure position where the cable is in a throttle-closed position;

a cap removably affixed to the housing element;

the cap defining a cavity open toward the housing element;

an actuator motor secured to the cap;

a paddle having flat sector shaped portion;

a sectored piece having an arcuate web means for fixing the paddle to the sectored piece so that the web and sector shaped portion stiffen one another;

a shaft of the actuator motor to which the paddle and the sectored piece are releasably fixed, whereby the paddle and the sectored portion are rotatable in the first direction and in a second direction with the shaft;

a tab extending from the first rotor element toward the cavity, the tab having a tip remote from the first rotor element;

a straight flange integral with the paddle along one edge thereof, the flange protruding from the cavity into engagement only with the tip, the flange oriented obliquely to the tip so as to contact an edge of the tip.

9. The mechanism of claim 8 further comprising:

a body fixed to the second rotor element;

wherein the flange is disposed so as to locate the tip between the flange and the body, so that the paddle's rotation in the first direction moves the rotor elements but the paddle's rotation in the second direction exerts no force on the rotor elements.

10. The mechanism of claim 8 wherein the fixing means comprises a polygonal pattern of fasteners, the pattern itself comprising:

a first fastener coaxial with the post, the first fastener passing through the paddle and the sectored piece and threaded with the post;

second threaded fasteners connecting the web to the sector shaped portion.

* * * * *